INVENTOR.
JOHN R. VANDE WEGE
BY C. A. Gulbrandsen
ATTY.

Feb. 11, 1969 J. R. VANDE WEGE 3,427,405

SEIZURE AND HOLD CIRCUITS FOR A COMMUNICATION SWITCHING NETWORK

Filed Oct. 19, 1964 Sheet 4 of 13

Feb. 11, 1969 J. R. VANDE WEGE 3,427,405
SEIZURE AND HOLD CIRCUITS FOR A COMMUNICATION SWITCHING NETWORK
Filed Oct. 19, 1964 Sheet 5 of 13

Feb. 11, 1969 J. R. VANDE WEGE 3,427,405

SEIZURE AND HOLD CIRCUITS FOR A COMMUNICATION SWITCHING NETWORK

Filed Oct. 19, 1964 Sheet 10 of 13

3,427,405
Patented Feb. 11, 1969

3,427,405

SEIZURE AND HOLD CIRCUITS FOR A COMMUNICATION SWITCHING NETWORK

John R. Vande Wege, Glen Ellyn, Ill., assignor to Automatic Electric Laboratories, Inc., Northlake, Ill., a corporation of Delaware Filed Oct. 19, 1964, Ser. No. 404,764
U.S. Cl. 179—18 11 Claims
Int. Cl. H04m 3/00, 3/20

ABSTRACT OF THE DISCLOSURE

An extra control conductor through the network is used to extend a seizure potential forward. A hold conductor is used to extend a hold potential back through selector and originating line switching stages, and forward through a terminating line stage. After a connection is established, the extra control conductor may be used for other supervisory signal functions forward or backward through the network.

This invention relates to supervisory apparatus, and more particularly to an arrangement for establishing communication paths for a communication switching system under the control of supervisory equipment.

In the past, communication switching systems have been provided with supervisory units to control the establishment of connections through switching networks from one supervisory unit to another and thence to a subscriber's line. The supervisory equipment was seized by a bypath arrangement via common control markers; and the connection through the switching network, once established, was held by a continuous connection from the supervisory unit via a control lead so that the control of the connection could be switched from the markers to a supervisory unit. This arrangement, however, is quite expensive as a result of the extra connections and equipment needed to communicate from one marker to another via the complex bypath arrangement.

The object of the invention, therefore, is to provide a more efficient and economical seizure and hold arrangement for supervisory equipment.

According to the invention, an arrangement is provided to seize supervisory equipment via an extra control lead which extends through the switching network. A seizure signal is transferred to a first supervisory unit via the extra control lead as a result of connections being established through the switching network to the first supervisory unit. This seizure signal causes a holding relay in its first supervisory unit to operate and thereby to request the service of a common control marker so that the connection may be further extended from the first supervisory unit to another supervisory unit for eventual completion of the call. Furthermore, this holding relay also holds the preceding connection to the first supervisory unit, thereby allowing control of the connection to be transferred from the marker to the supervisory unit.

Other objects and features of this invention relate to the supervisory units which use different arrangements for holding and releasing established connections, and other special features.

Figure 1:
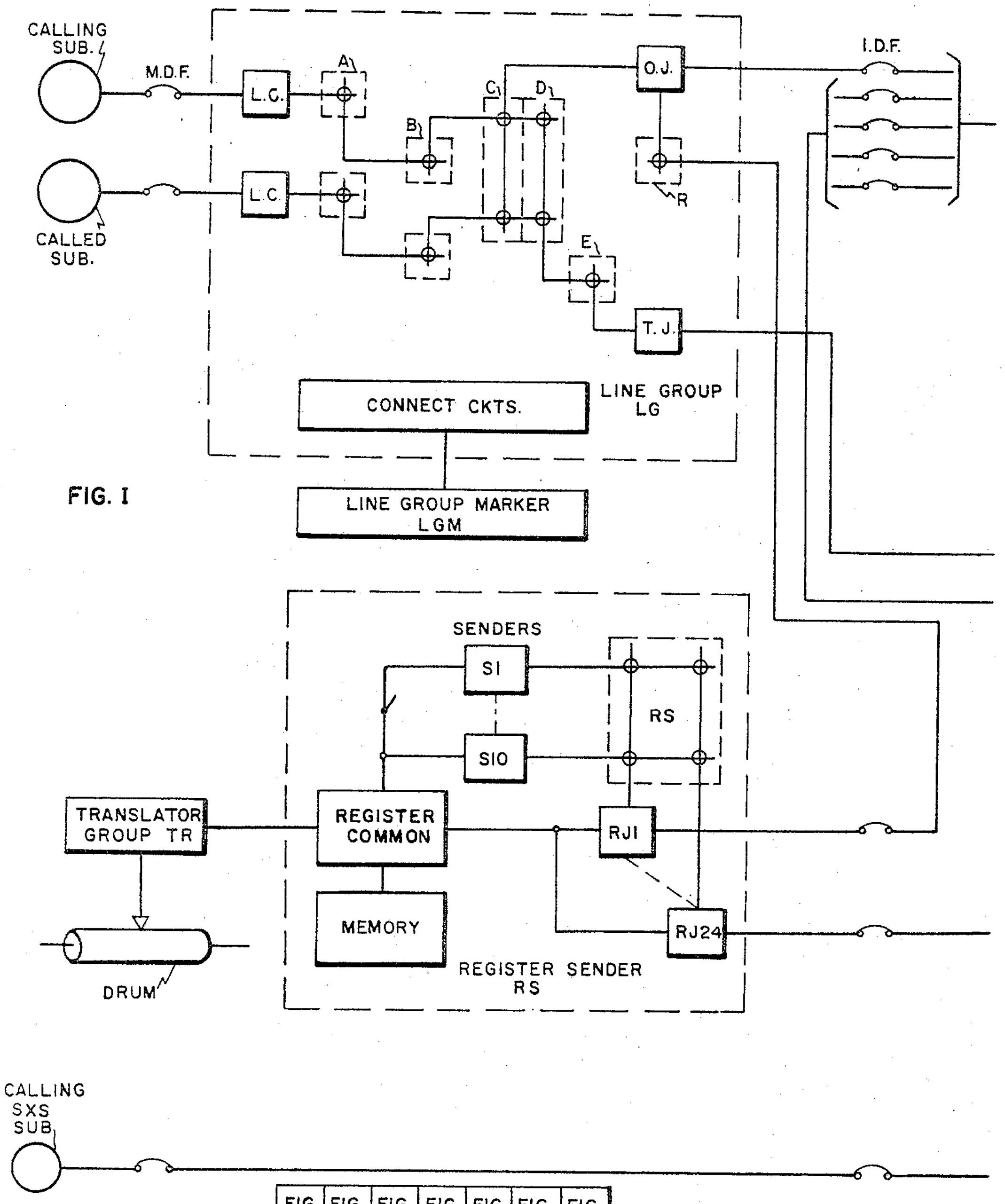
Figure 14:
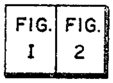
Figure 15:
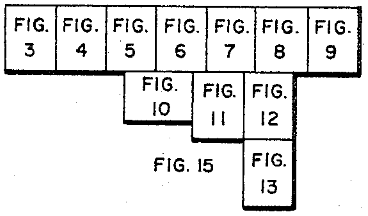
Figure 2:
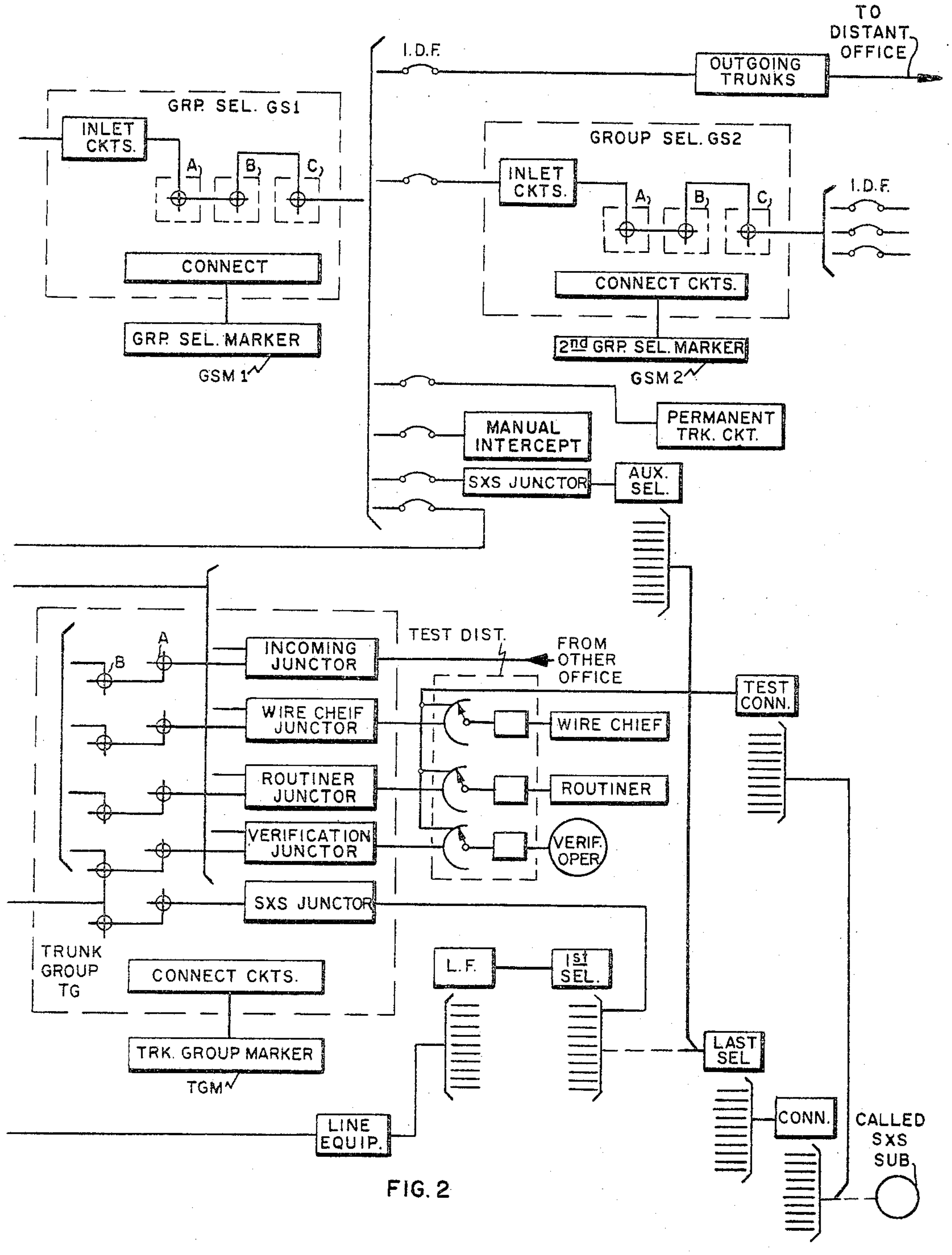
Figure 3:
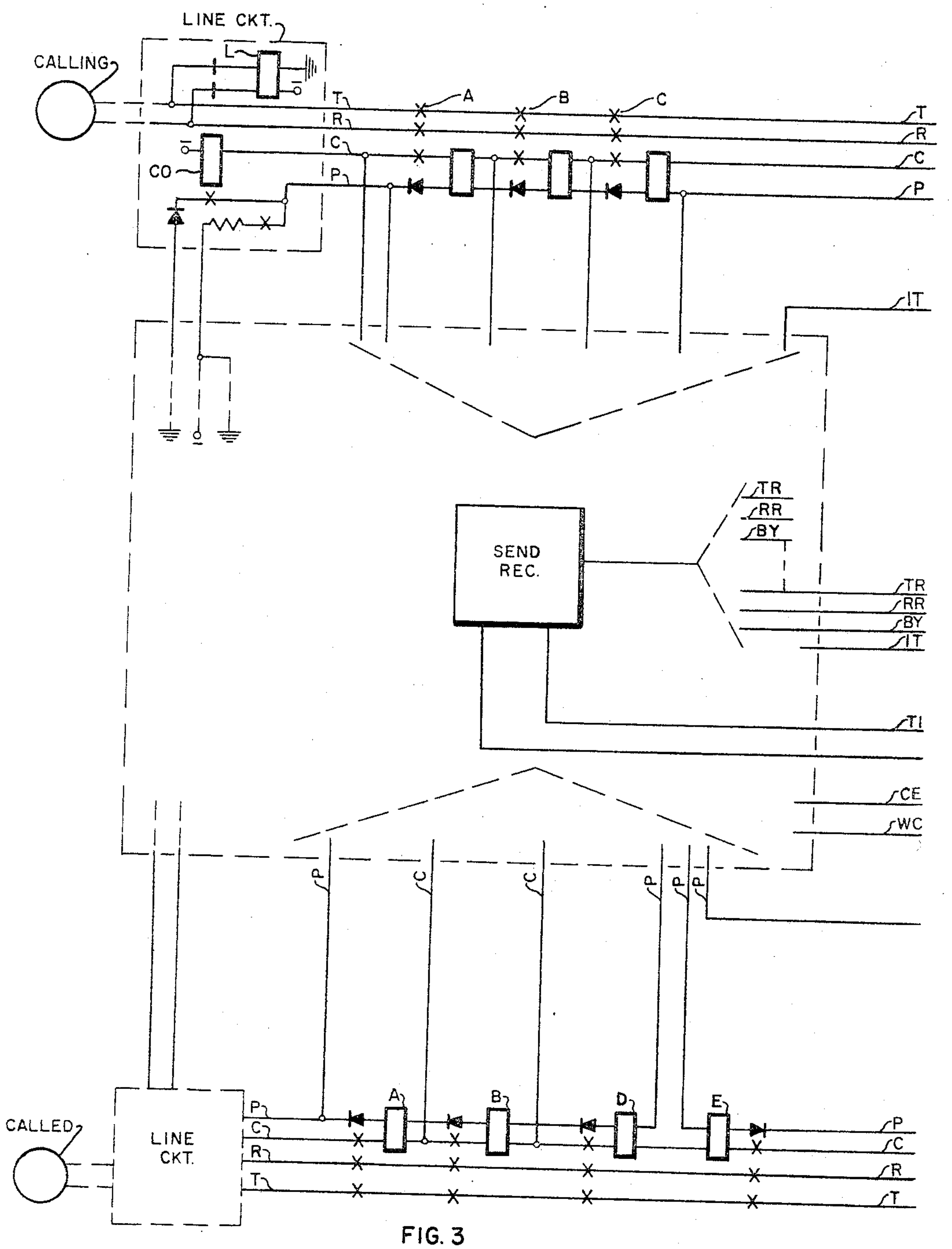

The above-mentioned and other objects and features of this invention and the manner of attaining them will become more apparent, and the invention itself will be best understood, by reference to the following description of an embodiment of the invention taken in conjunction with the accompanying drawings wherein:

FIGS. 1 and 2 when arranged as shown in FIG. 14 comprise a block diagram of a system in which the invention resides; and FIGS. 3–12 when arranged as shown in FIG. 15 comprise a schematic diagram of the block diagram as shown in FIGS. 1 and 2.

EXCHANGE DIAGRAM

FIGS. 1 and 2 when arranged together as shown in FIG. 14 comprise a single line block diagram of part of a telephone switching exchange, including various junctor arrangements for accessing the exchange.

*Step-by-step switching unit*

The direct dial controlled step-by-step switching unit shown in FIG. 2 indicates various interworking arrangements.

The typical switching unit as shown in FIG. 2 comprises linefinders, selectors and connectors which comprise two-motion stepping switches and associated relay control circuits. In many cases plunger or rotary line switches are used instead of the linefinders. There are also known direct control systems using switches other than those of the two-motion type.

The direct control step-by-step subscriber lines are connected via a main distributing frame and an intermediate distributing frame to the line circuits which are connected to the banks of the linefinder switches. The connectors have their bank contacts connected to the intermediate distributing frame for grouping to form party lines.

The switching unit is shown equipped for a seven digit numbering plan. The operation briefly is initiated by the calling step-by-step subscriber lifting his handset which operates a line relay in the line equipment and causes the linefinder to hunt and connect to the line circuit of the calling line. The calling line is now connected to a linefinder-selector link and receives dial tone. Operation of the dial at the subscriber station transmits loop interruption pulses which cause the first selector to step vertically to the level corresponding to the first digit, and during the interdigital pause the selector then automatically steps in the rotary direction until an idle trunk is found and the connection is extended to a second selector. The succeeding selectors in like manner operate on succeeding digits. On the next to last digit the connector steps vertically, and on the last digit it steps in the rotary direction, to the bank contacts of the terminal of the called line. The connector makes a busy test and if the line is idle it switches through and causes ringing current to be applied to the called line. The connector then provides answer supervision, provides battery feed to the calling and called lines during the connection, and provides disconnect supervision to release the connection at the end of the call.

Incoming trunk calls from other offices are handled in a similar manner, except that there is no linefinder, an incoming (auxiliary) selector being connected directly to the incoming trunks. Outgoing calls are also handled in a manner similar to local calls, except that after an appropriate one of the digits the connection is completed to an outgoing trunk circuit and thence to another office which completes the connection in response to the succeeding dialed digits.

In small offices some of the selector stages may be omitted and the corresponding digits absorbed by special digit absorbing selectors.

*Common control crosspoint switching unit*

Referring to FIGS. 1 and 2, the common control switching unit comprises two main parts, the transmission path and the common control. The transmission path comprises line groups such as line group LG controlled by line group markers such as marker LGM, and group selectors such as selector GS1 controlled by group selector markers such as marker GSM1. A second stage of group selection may also be added such as selector GS2 controlled by group selector marker GSM2. There is also a trunk group TG which provides access from incoming trunks and various special service trunks to the registers controlled by trunk markers such as marker TGM. The line group LG, the group selecter GS, and the trunk group TG each comprise an arrangement of crosspoint switching matrices. The crosspoints are made up of reed capsules having two windings—an operate winding and a hold winding. The markers employ electronic circuits which provide very high speed operation, and thus make possible the very short holding time in using the markers on a one-at-a-time basis.

The common control comprises register-sender groups such as group RS, and transistor groups such as group TR. Time division techniques are used in the register-sender group RS and in the translator TR. A ferrite core memory is used in the register-sender group for temporary storage, and a magnetic drum is used in the translator for semipermanent storage.

All of the electronic equipment is furnished in duplicate, for instance, two line group markers may serve up to ten line groups and two group selector markers may serve up to ten group selectors. A minimum of two register-sender groups will be equipped per office and the translator, including the magnetic drum and logic circuitry will always be furnished in pairs per 10,000 directory numbers.

*Ease of expansion*

Since the common control crosspoint switching unit will be applied most extensively in expanding existing step-by-step offices, considerable though has been given to implement such an addition with a minimum of cost and change to the existing facilities. This is one of the reasons why the system is grouped into four functional sections. Each of the system sections is self-contained with regards to its logic circuitry and operates in an asynchronized manner with regard to the other system sections, thus making it possible to add each of the other mentioned system sections to an existing step-by-step office and be completely tested before put into service.

The philosophy of the system goes beyond mere line additions. It is intended to upgrade the existing step-by-step office by providing considerable recording and translation capabilities to meet with future requirements.

Of great importance to the operating companies is the possibility of offering the features available to the common control unit subscribers, also to the subscribers located in the step-by-step part of the office. This is made possible due to the space division technique and the system compatibility with electromechanical switching requirements. As to the degree of compatibility, in an integrated office such as the one described above, it may be mentioned that a subscriber may move back and forth between the step-by-step and the common control trol unit without changing the directory number.

*Operation of crosspoint unit for a local call*

A brief description of a typical local call as processed through the common control crosspoint switching unit is now presented.

When a subscriber lifts the handset, the line group marker LG goes into action first by detecting the originating call mark, identifying the calling line, and selecting an idle one of the register junctors RJ1–24 within the register-sender. A path is then temporarily established from the calling telephone to the register junctor such as RJ1 via the A, B, C matrices, an originating junctor OJ and the R matrix, and the subscriber receives dial tone. The dialed digits are stored temporarily in the memory, coded, and processing is continued as these digits are passed to the translator TR, analyzed for type of incoming call, and instructions are selected from the drum memory and returned to the register-sender to guide further handling of the call. Upon receipt of the remaining digits, the translator TR returns switching instructions corresponding to the called number as stored in the drum memory. The instructions are transmitted from the register-sender RS via one of the senders such as S1 and the originating junctor of the originating line group to the group selector GS. In the group selector GS, the instructions are analyzed by the marker GSM, an idle terminating junctor in the terminating line group is located, and a path established to that line group via A, B and C matrices of the group selector. The remaining instructions are followed by the line group marker to locate the called line terminals, select and seize a path from the terminating junctor through the E, D, B, and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender RS and the translator TR are functioning on a time division basis and therefore are processing several calls simultaneously. The temporary signaling and control paths are released for further service, while only the talking paths are held through the switching matrices and junctors.

*Interworking calls*

Assume that a calling subscriber on a step-by-step line in FIG. 1 initiates a call to a crosspoint line, called subscriber also in FIG. 1. The call proceeds by seizure of a finder-selector link, and setting up a connection via selectors in response to dialed digits until sufficient digits have been dialed to determine that the call is to be terminated in the crosspoint switching unit. The first selector being stepped to this level, as shown in FIG. 2, selects a trunk to a junctor in the crosspoint trunk group, such as the step-by-step junctor 231. The trunk from the first selector to the junctor comprises three conductors, and ground is placed on the control conductor in the junctor upon seizure to mark it busy. During the interdigital pause the trunk group marker TGM recognizes the call and causes a connection to be completed from the junctor via the A and B stages in the trunk group TG to a register junctor in the register sender group RS. The trunk group marker also supplies class of service and trunk number identity to the register sender group. The remaining three digits dialed by the step-by-step subscriber are then recorded in the register memory. The translator TR is seized and the class of service information along with the three dialed digits are supplied thereto. As explained in the copending U.S. application Ser. No. 309,093 filed Sept. 16, 1963, now Patent No. 3,284,574, by E. P. Kostogiannis et al. for a Magnetic Drum Translator, the translator makes use of the class of service information along with the dialed digits to recognize the directory number of the called subscriber and accordingly derive the equipment location number from the drum and return it to the register. The register supplies the instructions and equipment location number to the sender which then proceeds to cause a connection to be completed via the crosspoint group selector and line group to the called line and the appropriate station signal.

Assume now that a calling subscriber on a crosspoint line in FIG. 1 initiates a call to a called step-by-step subscriber line in FIG. 2. The line group marker causes a connection to be established through the line group A, B, C stages, an originating junctor and an R stage to a register junctor in the register sender group, and the seven digits dialed by the subscriber are received and recorded in the register sender memory. The translator returns routing information designating a crosspoint group selector outlet level to the local step-by-step equipment along with instructions to then outpulse the last three dialed digits. As shown in FIGS. 1 and 2 trunks from this group selector output level are connected directly to fifth selectors in parallel with outlets from step-by-step fourth selector levels. Thus in accordance with the translator instructions the sender causes the connection to be established through the group selector for this level, and the last three dialed digits are dial pulsed to step the fifth selector and the connector to the designated line terminal.

In another arrangement not shown in FIGS. 1 and 2 the crosspoint group selector outlets from the level to the local step-by-step unit may be directly connected through individual first selectors, in which case the instructions from the translator would designate that all seven of the dialed digits are to be dial pulsed.

*Special incoming calls*

Arrangements for accessing subscriber terminals by wire chief, operator busy verification, routiner test equipment, or another crosspoint common control office, differ between the step-by-step and common control equipment. The step-by-step equipment uses a separate test switch train from a test distributor. Each shelf of connectors is provided with one test connector to which all of the test distributors have access. There is usually one test distributor provided for wire chief calls, another for operator busy verification, and another for routiner test calls. The incoming junctor in the incoming trunk group provides access from another crosspoint common control office.

The common control equipment on the other hand is designed to provide access via the same switching network through the group selector and the line group as is used for normal traffic, with access provided via special junctors in the incoming trunk group, as described in my copending patent application for Automatic Central-Office Equipment Testing Arrangement by J. R. Vande Wege, Ser. No. 361,127 filed Apr. 20, 1964, now patent No. 3,376,398, which discloses the routiner and wire chief junctors in detail.

Figure 13:
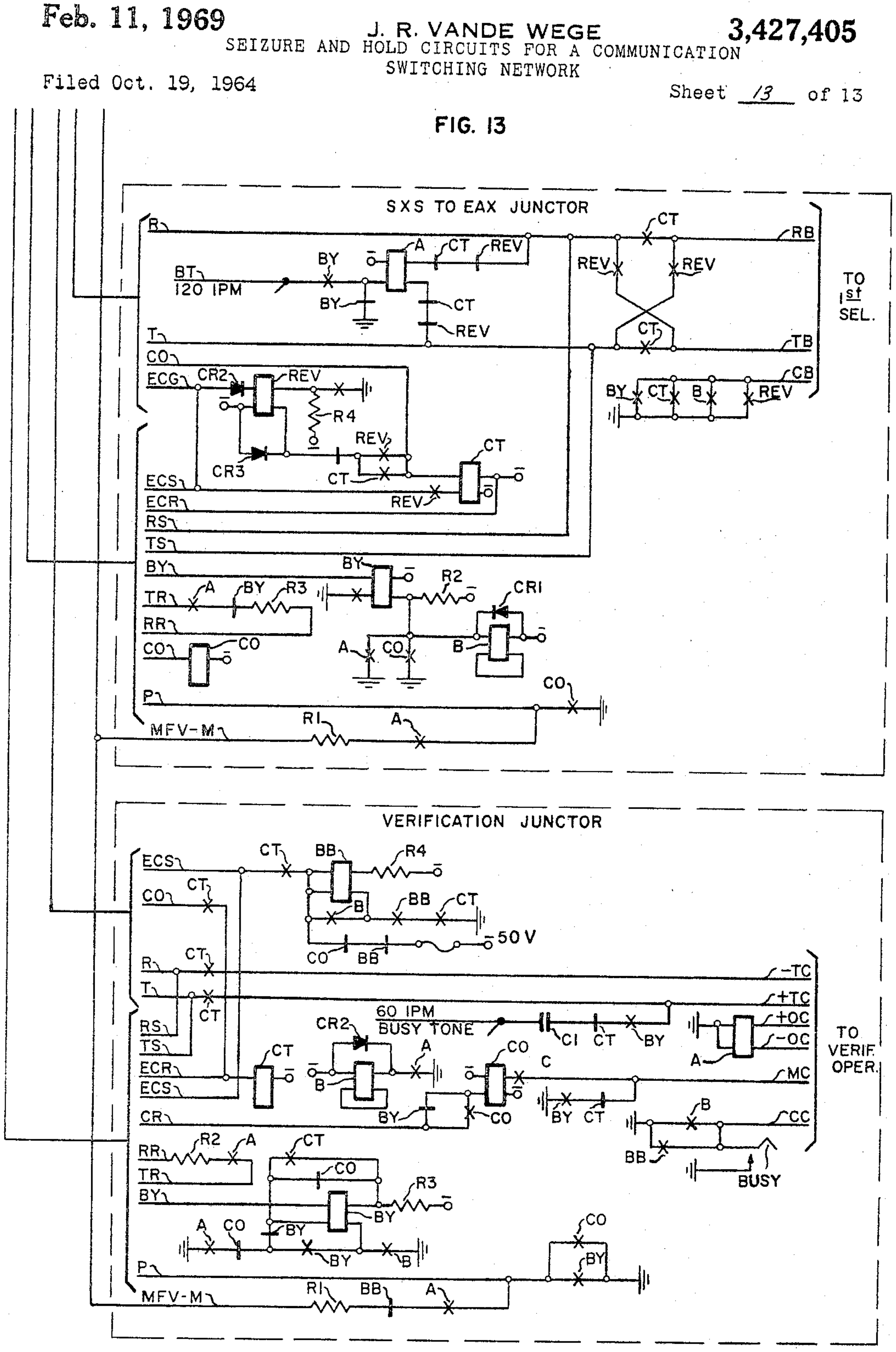

The vedification junctor provides an access from a step-by-step switch train to access common control crosspoint subscribers. It is very similar to the routiner junctor with the addition of the BB relay shown in FIG. 13 which can cause a ground potential to be connected to lead ECS through contacts of relays CT, BB, and B so that this ground potential can hold the terminating junctor after cut-through has occurred to cause relay CT to operate. Also, relay BB can cause a −50 volt potential to be connected to lead ECS to cause the terminating junctor to release. The translator recognizes the class of service of the special junctor and provides a special digit in place of the party digit in the translator switching digits. This is recognized in the terminating junctor to provide the proper metallic path and other requirements. A special WC lead from the cutoff relay in the line circuit is taken via a relay tree in the marker to control the cutoff relay and permit connection to a busy line.

Separate points of access to common control in step-by-step test or verification trunks could be provided at the test and operators' positions. A uniform point of access would, however, be more desirable. This may be accomplished as shown in FIG. 2 by routing all wire chief calls via one test distributor and busy verifications calls via another test distributor. As snown there could also be a separate test distributor for routiner operation. All common control lines appear on specific levels of the test distributor. These levels are arranged to hunt automatic rotary for the junctors into the common control equipment. By use of class-of-service identity and the three remaining dialed digits, the common control translator will recognize the call as being special and will have sufficient information to reach the called line.

*Special outgoing calls*

Arrangements are provided for establishing connections from a group selector to a distant common control crosspoint office or to the step-by-step equipment office shown in FIG. 2, or to special trunk circuits. The outgoing trunk circuit provides a connection to the distant common control crosspoint office, and the step-by-step junctor provides a connection to the auxiliary selector and thence to a step-by-step office. The special trunk circuits include the permanent and the manual intercept trunk circuits.

The permanent trunk circuit is used when a permanent signal condition occurs, which may result from faulty use of the station equipment, from a trouble condition outside of the exchange office, or failure of a paystation to refund. After dial tone is sent to the calling party, the register allows four-twenty seconds for receipt of the first digit. If no digit is received in this period, the call is routed through the group selector to the permanent trunk. If all of the permanent trunks are busy, the sender operates a busy tone relay in the originating junctor.

The manual intercept trunk is used to provide intercept-answer service for calls requiring operator answer. This trunk is used, for example, when a calling subscriber dials a non-existent number.

DETAILED DESCRIPTION OF SEIZURE AND HOLD

The seizure and hold arrangement for the various junctors of the common control crosspoint system are of a uniform nature. That is, all of the junctors are seized and held in essentially the same manner. This seizure and hold arrangement is best understood by considering the terminating junctor in detail. The incoming junctors in the trunk group TG use the basic seizure and hold scheme, but each uses a different type of answer supervision once the junctur is held. Therefore, the operation of the terminating junctor will be considered first in order to describe the operation of seizure and hold for the system.

*Terminating junctor*

Figure 5:
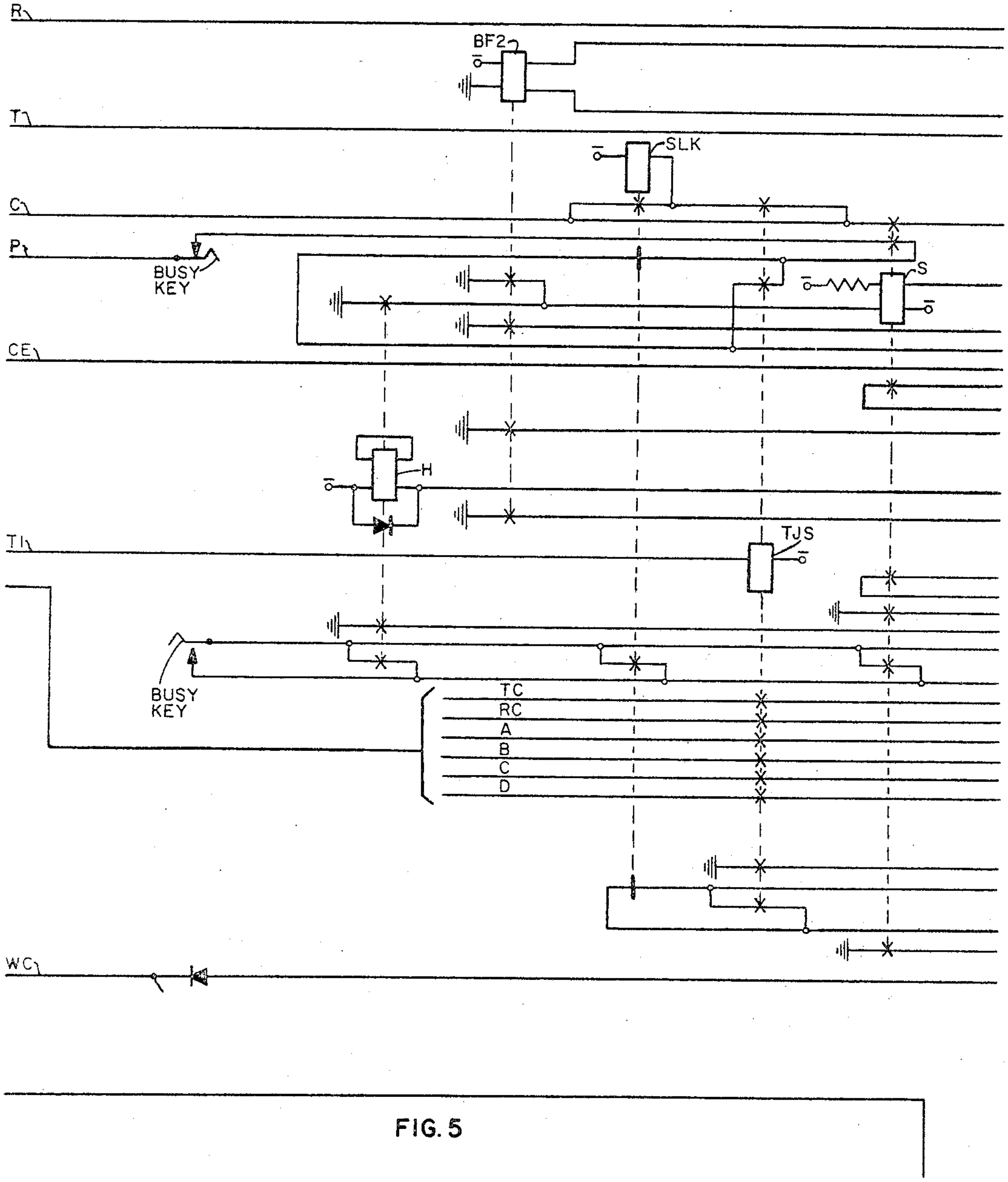
Figure 6:
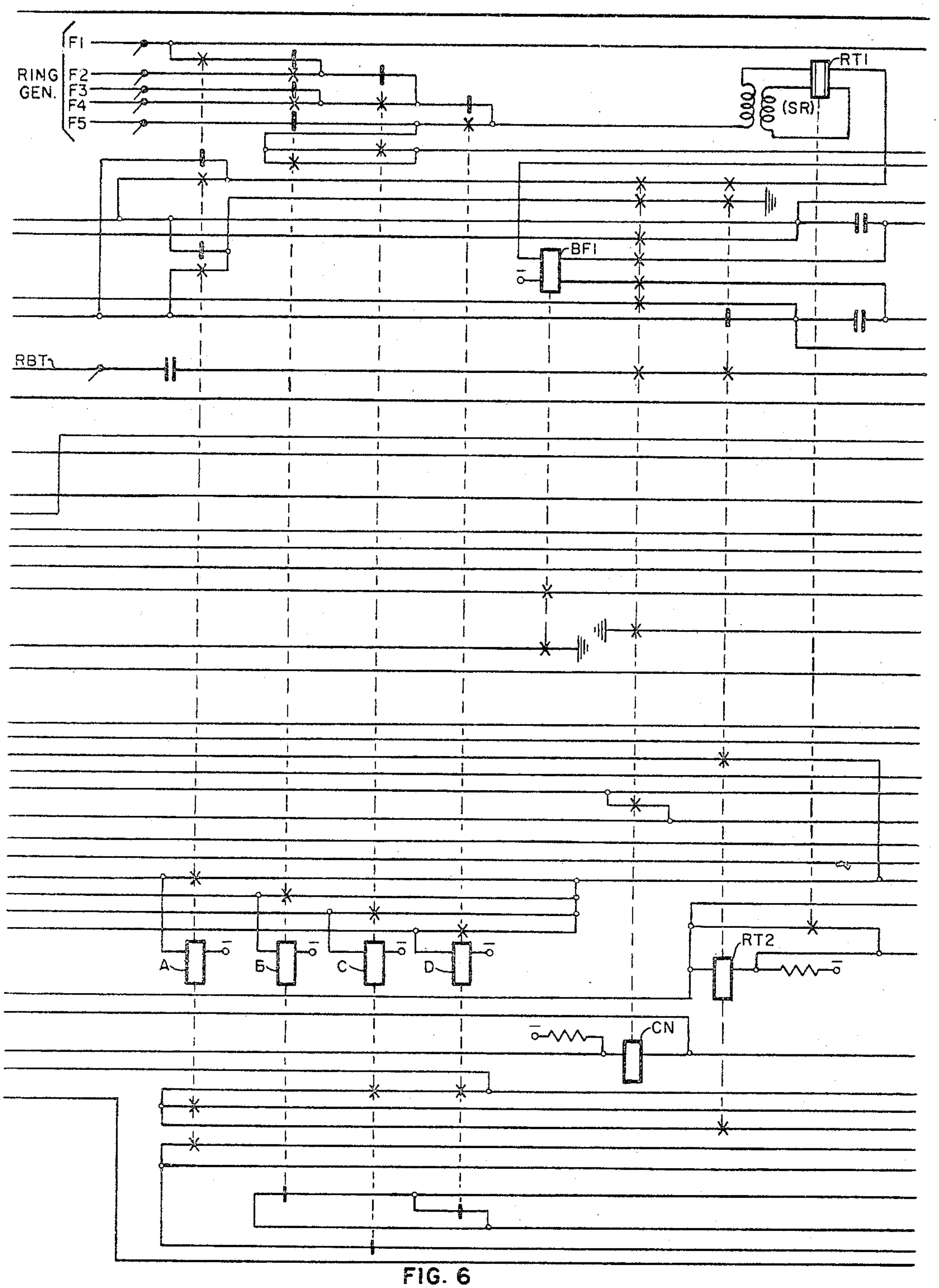
Figure 7:
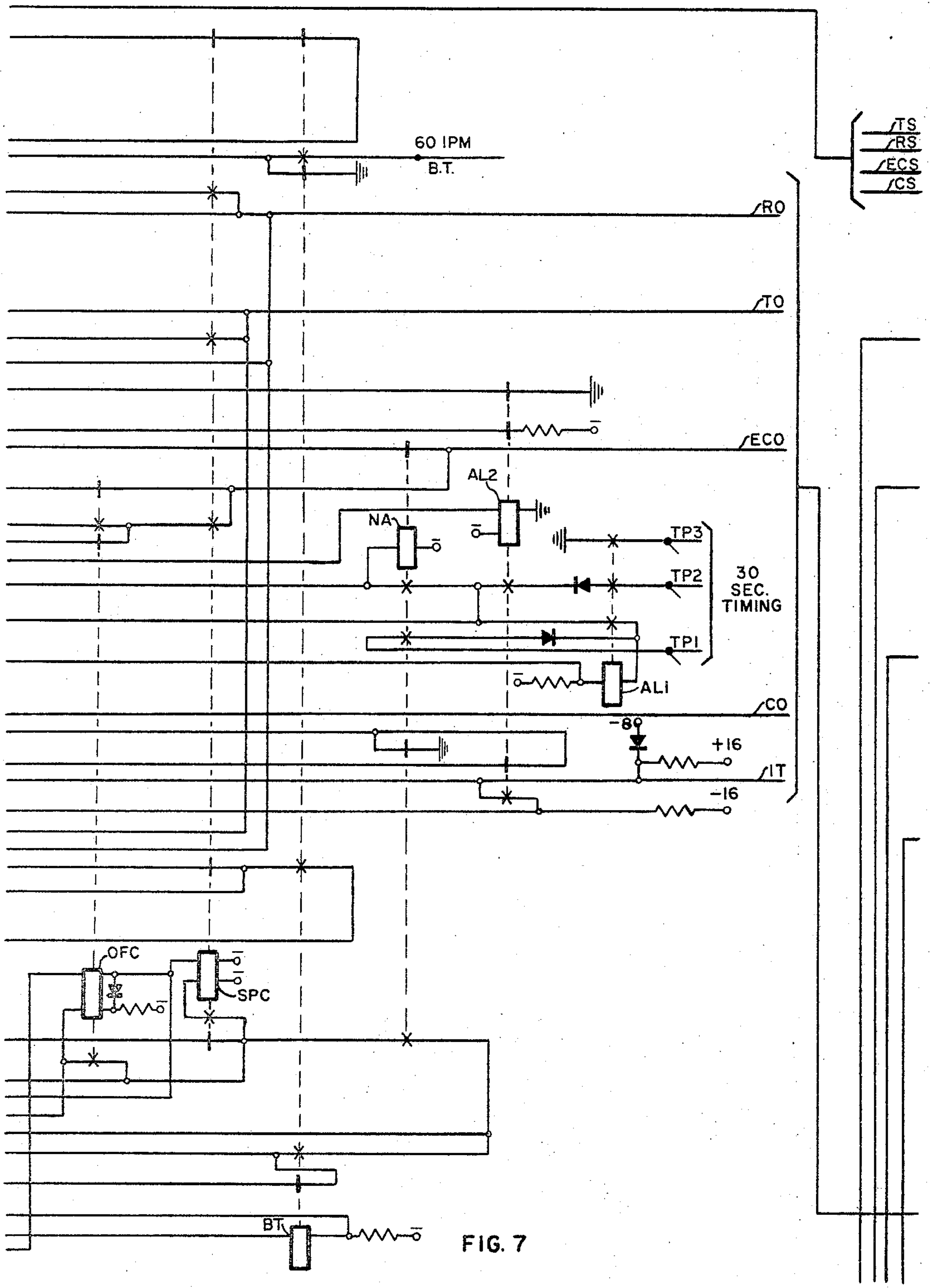

The terminating junctor is shown by a schematic diagram in FIGS. 5, 6 and 7. It provides access from a group selector outlet, via the IDF through the junctor and thence through matrices E, D, B and A to a called line.

Battery feed is provided to the calling line by relay 6BF1, and to the called party by relay 5BF2.

Busy-idle indication is provided on lead IT for use by a parallel test circuit in the group selector marker.

Relay 5TJS when operated provides a path from the TO and RO conductors to conductors TC and RC, which completes a path from the sender over the transmission path to the send-receive circuit in the marker. This relay is operated under the control of the marker by a signal on lead TF. Relay 5TJS also completes a path for the ringing code signals from the send-receive circuit on conductors A, B, C and D to the ringing control relays 6A, 6B, 6C, and 6D.

Operation of one or more of the relays 6A, 6B, 6C and 6D, applies one of five different ringing frequencies to either lead T or lead R to provide fully selective five-party bridged or ten-party divided ringing, in accordance with the binary code received on leads A, B, C and D as shown in the following table.

| A | B | C | D | Gen. Connection | Ringing Frequency |
|---|---|---|---|---|---|
| 0 | 1 | 0 | 1 | T | F1 |
| 1 | 0 | 0 | 0 | R | F1 |
| 0 | 1 | 0 | 0 | T | F2 |
| 1 | 1 | 0 | 0 | R | F2 |
| 0 | 0 | 1 | 0 | T | F3 |
| 1 | 0 | 1 | 0 | R | F3 |
| 0 | 1 | 1 | 0 | T | F4 |
| 1 | 1 | 1 | 0 | R | F4 |
| 0 | 0 | 0 | 1 | T | F5 |
| 1 | 0 | 0 | 1 | R | F5 |
| 0 | X | 1 | 1 | T | F1 |
| | | | | Special Functions | |
| 1 | 1 | 0 | 1 | Return line busy (60 I.P.M.). | |
| 0 | X | 1 | 1 | No ans. supy. (OFC operates). | |
| 1 | X | 1 | 1 | No ans supy. or ringing. (OFC) & metallic cut-thru (SPC operates). | |

Ringback tone from the source on lead RBT is supplied to the calling party during ringing. Busy tone from the 60 I.P.M. source is supplied to the calling party when the proper binary code as shown in the table is received from the marker to operate relay 7BT.

Figure 4:
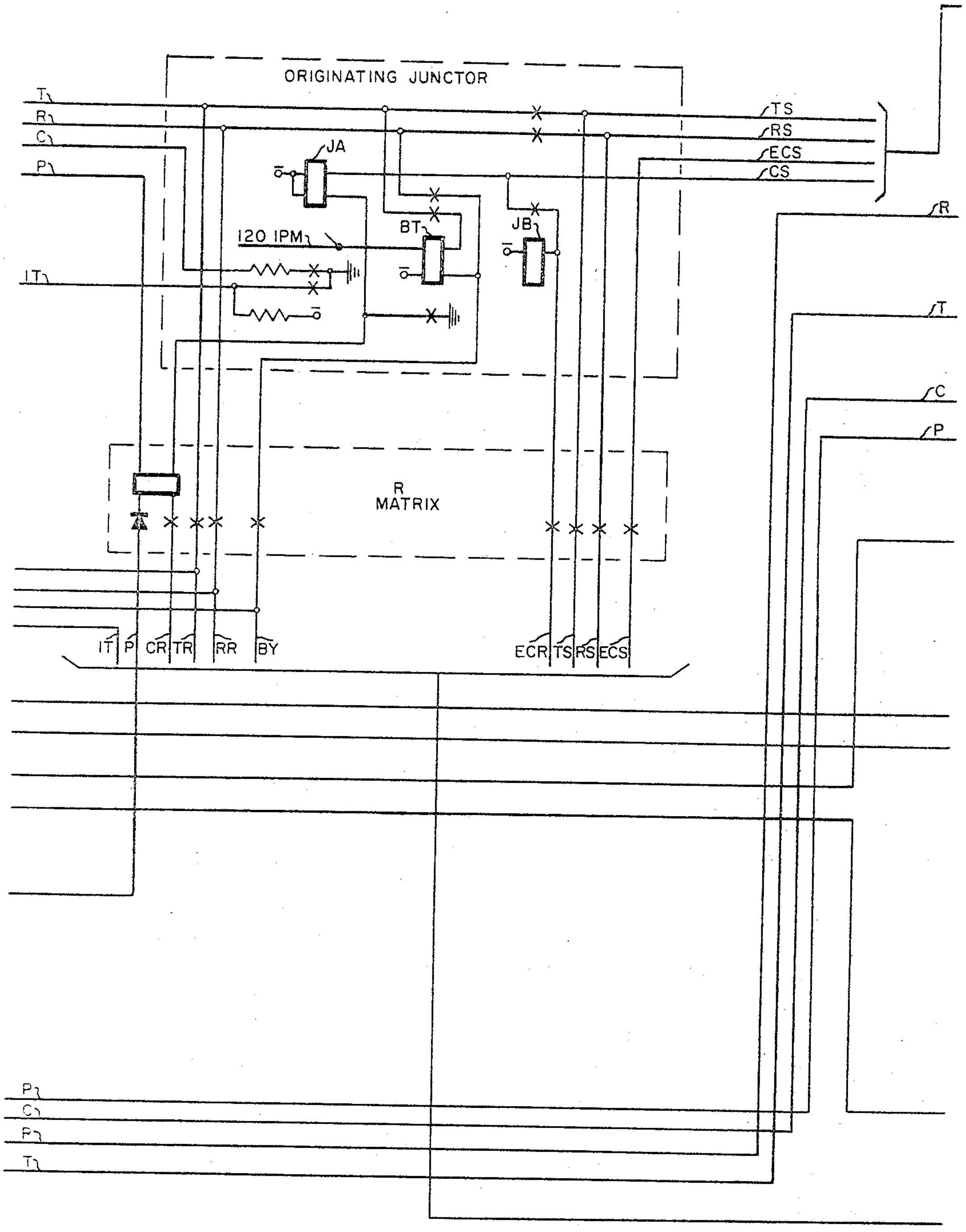
Figure 8:
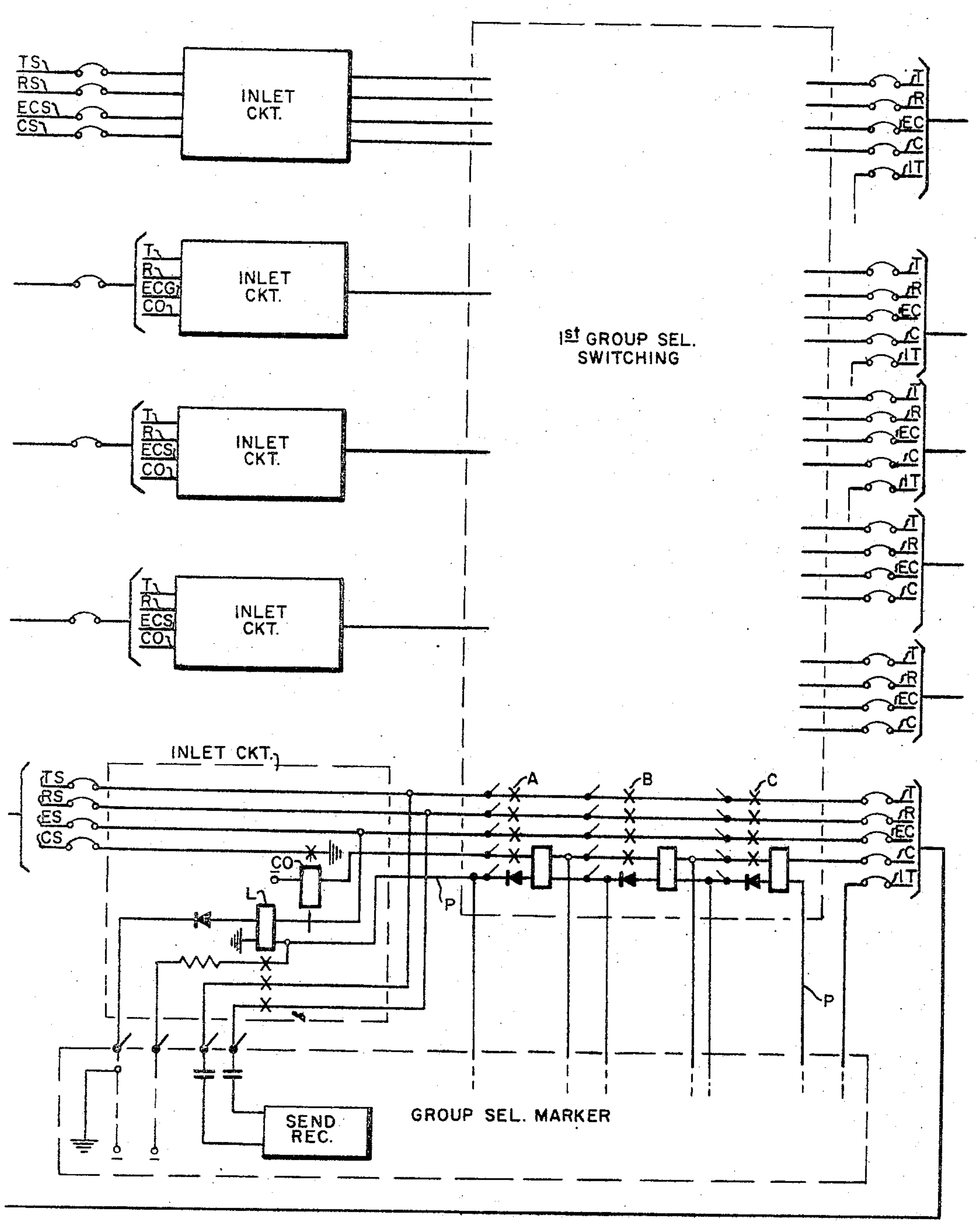
Figure 9:
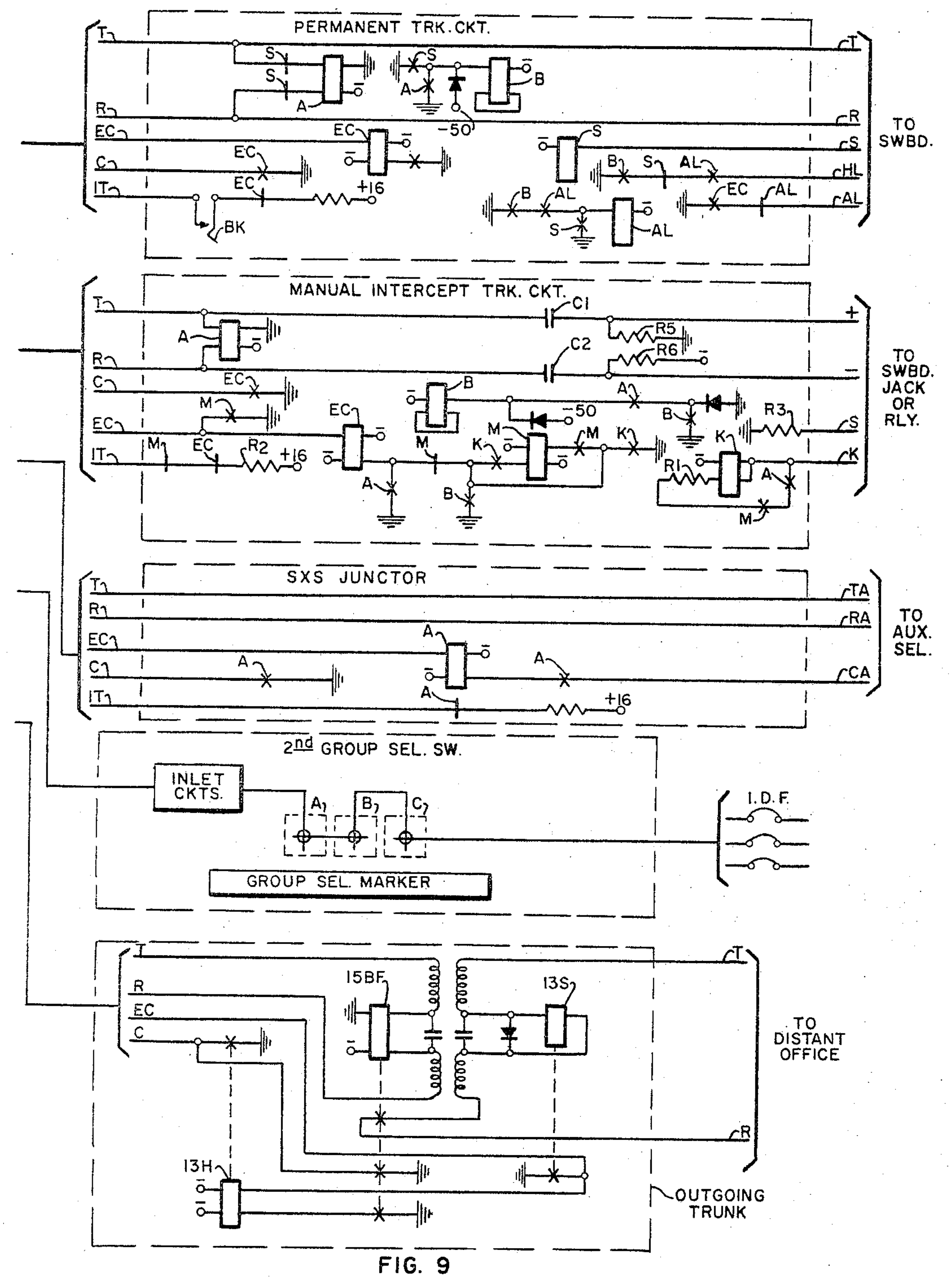
Figure 10:
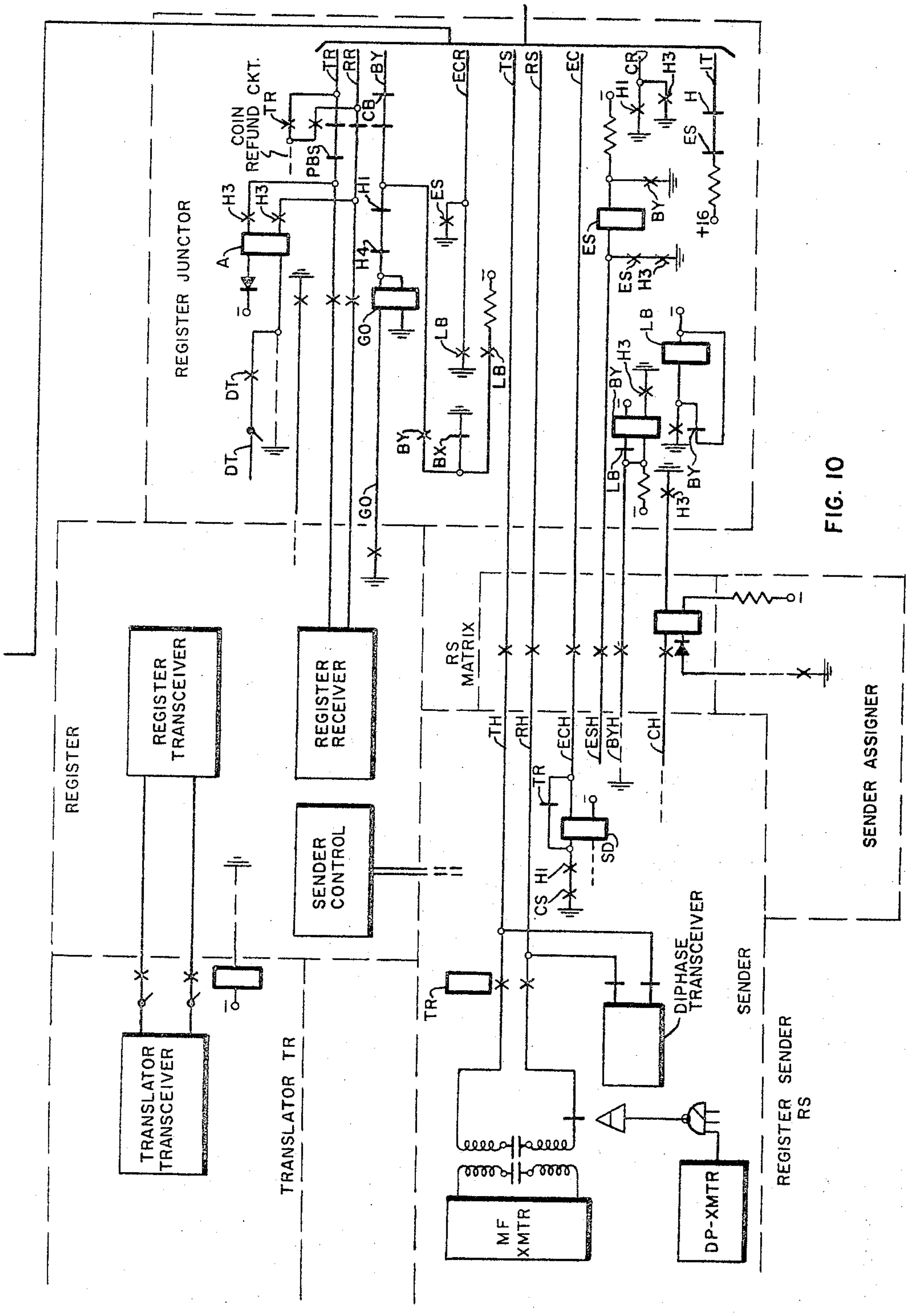
Figure 11:
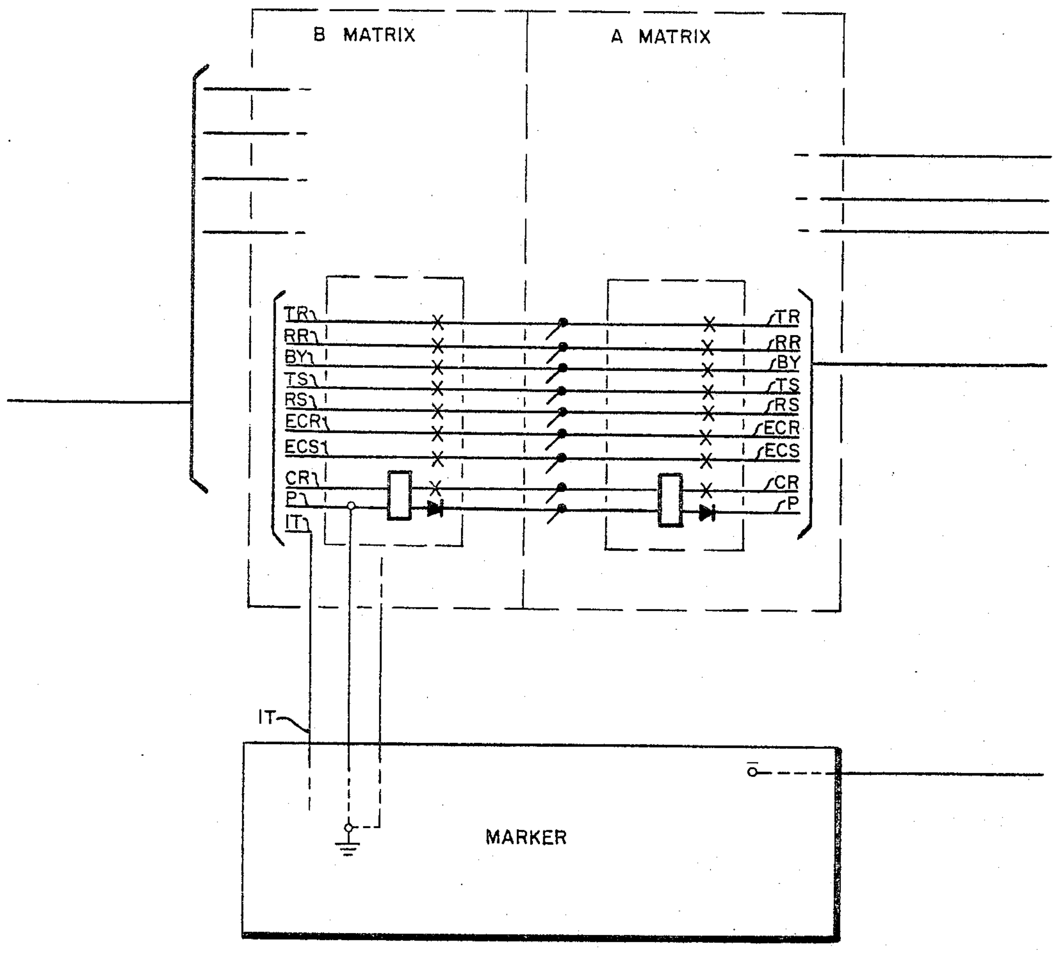
Figure 12:
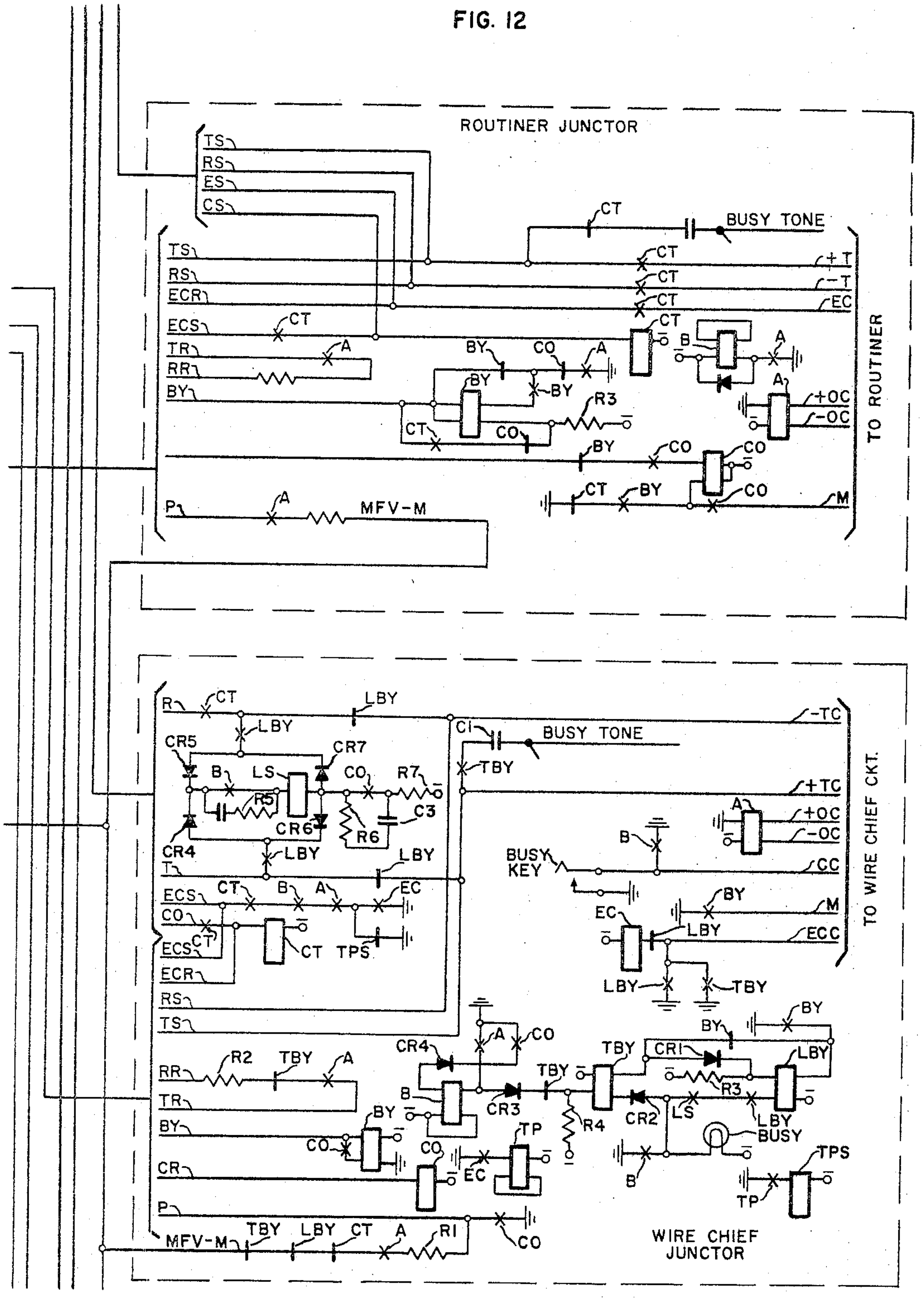

The terminating junctor is seized by ground forwarded from the sender shown in FIG. 10 via relay SD, lead ECH, the RS matrix, register junctor, the R matrix (lead ECS) and originating junctor shown in FIG. 4, inlet circuit and first group selector switching stages shown in FIG. 8, and thence to lead ECO to operate relay 5S in FIG. 5.

The inlet circuit is seized in the same manner by the same ground potential from the sender via relay SD to the extra-control lead ECS, through the originating junctor and thence to the inlet circuit to operate relay L shown in FIG. 8. Relay L operates and connects a ground potential on lead CS to hold the originating junctor operated (the register junctor holds the originating junctor operated by a ground potential via lead ECR until the register-sender group releases after cut-through). Relay L also connects a negative potential from the group selector marker via the A, B, and C crosspoints and thence to the group selector marker, thereby seizing it. The group selector marker then pulls the appropriate crosspoints to establish the connection to the terminating junctor. Once this connection is established, ground from the sender is extended forward via lead EC to the terminating junctor to operate relay 5S, thereby seizing the terminating junctor.

Relay 5S through its contacts 4 completes a path to ground to hold the preceding switch train by operating the cut-off relay CO in the inlet circuit, thereby holding the connection through the first group selector by holding the A, B, and C crosspoints operated in series. Relay 5S also completes a path to ground via its contacts 1 to provide a holding potential to lead C so that a connection through the line group, once established, can be held by operation of the cut-off relay in the appropriate line circuit. Furthermore, relay 5S connects a negative battery potential via its contacts 2 and contacts 2 of relay 7AL2 to lead P to request the service of the line group marker so that the connection can be established through the line group to the called subscriber.

It can be seen from the foregoing that the extra-control lead EC is used to seize forward by extending a ground potential from the sender from one junctor circuit to another. Once the EC lead has been used to seize forward, this same extra-control lead is also used for four different control purposes as follows: (1) extending ground forward to hold a junctor as used by the verification, wire chief, and routiner junctors in the incoming trunk group, (2) open circuit to release the succeeding switching stages as used by the routiner junctor, (3) negative battery for releasing the terminating junctor as used by the verification junctor and the routiner junctor, and (4) a timed ground-pulse for the inward wire-chief test as used by the wire chief junctor. This extra-control lead is also used for sending answer supervision from the terminating junctor to the step-by-step junctor so that a reverse battery indication can be transferred from the step-by-step junctor to the step-by-step equipment.

In response to answer supervision ring trip relay 6RT1 operates and at its single make contacts shorts the winding of relay 6RT2, which connects the called party to the voice transmission path. Relay 5BF1 then operates, and at its contacts 2 applies ground which extends through break contacts of relay 7OFC to lead ECO to repeat answer supervision to the preceding switch train.

In response to one of the codes as shown in the table, relays 7SPC and 7OFC to provide a metallic path (T and R) free of attachments and inhibits ringing and answer supervision for vertification, wire chief, and routiner calls. In response to another code, relay 7OFC operates to inhibit answer supervision on calls to offical numbers, such as the telephone company business office.

Release of the succeeding switch train may be controlled by the routiner. Opening lead ECO releases the succeeding switch train but holds the terminating junctor seized. The terminating junctor is released when negative battery potential is applied to lead ECO.

Release of the preceding switch train is delayed approximately 135 milliseconds after the calling party releases to protect against unintentional interruption of the calling loop.

Timed disconnect of the preceding switch train and the terminating junctor 30 seconds after the called party disconnects is provided.

An arrangement is provided to permit the called party to hold the succeeding switch train and the terminating junctor.

*Special calls*

The terminating junctor is held operated by causing relay 5S to operate. For special calls relay 5S is operated from a ground on lead ECO so that the release and control of the terminating junctor is controlled by one of the special junctors. The verification, routiner, and wire chief junctors provide a ground for connecting to the lead ECO of the terminating junctor once the terminating junctor has been seized. A routiner test call provides this special holding ground from the routiner and passes this potential through the routiner junctor via lead EC and thence to the terminating junctor.

Secondly, the EC lead is used by the routiner for routiner calls to drop only the connection from the terminating junctor to the called line through the line group switching stages by removing the ground potential from lead EC. This action causes the connection to be dropped through the line group while holding the connection through the group selector so that the routiner can automatically transmit switching instructions to the line group marker to thereby establish a connection to the next succeeding line in the line group for testing purposes.

Thirdly, the routiner and the vertification junctor can supply a —50 volt battery potential via lead EC for causing the terminating junctor to release both the succeeding and preceding switching stages. This negative 50 volt battery is located in the routiner for routiner test calls, whereas this source of potential is located in the verification junctor for verification calls.

The wire chief junctor has a fourth use for the EC lead connection; i.e., controlling forward on the EC lead by providing a timed ground pulse on the EC lead to cause the initiation of this special wire chief test.

*Normal calls*

A normal call, one which is not a special call, causes the terminating junctor to be held in response to the battery feed relay 6BF1 which operates 5H, thereby causing relay 5S to be held operated. Therefore, release of the terminating junctor is under the control of the calling line which directly controls battery feed relay 6BF1. Therefore, the EC lead can be used for answer supervision to the step-by-step junctor. The answer supervision signal causes ground to be connected to lead ECS to operate relay REV, shown in FIG. 13, thereby causing relay CT to restore. Relay REV operates first, then relay CT restores to reverse the battery feed potential from the terminating junctor, which thereby transfers a reverse battery answer-supervision indication to the step-by-step equipment.

The foregoing description is a typical embodiment of this invention, the novel features of which are specifically described in the following claims appended hereto.

What is claimed is:

1. In a communication switching system, a switching network which includes a selector section for connecting any one of a plurality of inlet terminals to any one of a plurality of outlet terminals, said selector section including a plurality of switching devices to switch, in each connection, a set of conductors including transmission path conductor means (T and R), a seizure conductor (EC) and a hold conductor (C);

marker means to operate the switching devices to connect the set of conductors between the selected inlet terminal and the selected outlet terminal;

a plurality of supervisory units individually connected to the outlet terminals, each supervisory unit including seizure means and hold control means, means supplying a given potential via the inlet terminal and the seizure conductor of the connection through the selector section to the seizure means of the supervisory unit to operate said seizure means, means responsive to the operation of the seizure means to operate the holding means to supply a holding potential to the hold conductor of the connection to hold the switching devices of the selector section operated.

2. In a communication switching system, the combination as claimed in claim 1, wherein said switching network further includes an input section for connecting any one of a plurality of inlet terminals to any one of a plurality of outlet terminals of the input section, said input section including a plurality of switching devices to switch, in each connection, a set of conductors including transmission path conductor means (T and R) and a hold conductor (C);

wherein each of said sections comprises a plurality of stages in tandem, in which the switching devices of each stage comprise a plurality of crosspoint relays arranged in co-ordinate array, each relay having a hold winding in series with a normally open set of contacts, each connection in each section having the hold conductor extending from the inlet terminal through the hold winding and series of contacts of a crosspoint relay of each stage to the outlet terminal;

a plurality of coupling means, each of which is individually connected to an outlet terminal of the input section and an inlet terminal of the selector section, said coupling means including a hold-repeating relay means having a winding connected to the hold conductor of the selector section at the inlet terminal so that it is in series with the hold windings of the crosspoint relays and operates when said holding potential is supplied to the hold conductor from the supervisory unit connected at the outlet terminal thereof, and contact means connected to operate responsive to energization of said hold-repeating relay means winding to supply a holding potential to the hold conductor of the input section at the outlet terminal thereof to hold operated the crosspoint relays of the input section.

3. In a communication switching system, a combination as claimed in claim 2, wherein said coupling means comprises an originating junctor connected to said outlet terminal of the input section and a selector inlet circuit connected to said inlet terminal of the selector section, and a connection between the originating junctor and the selector inlet circuit;

wherein said switching network further includes a register section for connecting any one of the originating junctors to any one of a plurality of register junctors, comprising a plurality of crosspoint relays arranged in co-ordinate array, each relay having a hold winding in series with a normally open set of contacts connected to be in series with a hold conductor extending in a connection from the originating junctor to the register junctor;

said hold-repeating relay means comprising a cutoff relay in the selector inlet circuit and a holding relay in the originating junctor, said hold-repeating relay means winding being the winding of the selector inlet cutoff relay, the originating junctor holding relay having two windings, one of which is connected to contacts of the selector inlet cutoff relay, and the other of which is connected to the hold conductor of the register switching section, the holding relay being initially operated upon the completion of a connection through the input section via the originating junctor and the register section to a register junctor, being operated via its holding winding in series with the crosspoint relay in the register section, said contact means of the hold-repeating means being contacts of the originating junctor holding relay connected to supply the holding potential to the hold conductor of the input section;

wherein said seizure conductor which is switched in the connection through the selector section further extends through the selector section inlet circuit and contacts of the crosspoint relay of the register switching section to the register junctor;

said selector section inlet circuit further including a line relay having a winding connected via contacts of the cutoff relay to the seizure conductor, means to connect the source of said given potential to the seizure conductor via the register junctor, to operate the line relay, means responsive to the operation of the line relay to signal the selector section marker to cause the connection to be established from the inlet circuit to the supervisory unit at the outlet terminal to thereby operate the cutoff relay in series with the hold conductor path through the connection to disconnect the line relay from the seizure conductor, the holding relay of the originating junctor being then held via its winding connected to contacts of the cutoff relay, so that after release of the register section connection, the connection is held from the supervisory unit through the selector section to the coupling means, and repeated from the coupling means through the input section.

4. In a communication switching system, the combination as claimed in claim 3, wherein at least some of said supervisory units are terminating junctors; and in which the switching network further includes a terminating section for connecting any one of a plurality of the terminating junctors to any one of a plurality of line terminals, said terminating section including a plurality of crosspoint relays as switching devices to switch, in each connection, a set of conductors comprising only transmission path conductor means (T and R) and a hold conductor (C);

marker means for the terminating section to operate the crosspoint relays to connect the set of conductors between a selected terminating junctor and a selected line terminal;

each said terminating junctor including means responsive to operation of its seizure means to signal the marker for the terminating section that it is requesting service, the marker being arranged to respond to this request for service and complete the connection to the selected line terminal, and the terminating junctor further including means effective after completion of the connection through the terminating section to maintain operated the holding means independently of the given potential supplied via the seizure conductor through the selector section, to thereby maintain the holding potential on the holding conductor to the selector section, and also to apply holding potential to the holding conductor of the terminating section.

5. In a communication switching system, the combination as claimed in claim 1, wherein a connection is further extended from the supervisory unit to a called terminal, each supervisory unit further including means responsive to answering of the call to apply a potential to said seizure conductor to transmit a signal via the connection through the selector section and the inlet terminal that the call has been answered.

6. In a communication switching system, the combination as claimed in claim 1, wherein at least some of said supervisory units are terminating junctors; and in which the switching network further includes a terminating section for connecting any one of a plurality of the terminating junctors to any one of a plurality of line terminals, said terminating section including a plurality of crosspoint relays as switching devices to switch, in each connection, a set of conductors comprising only transmission path conductor means (T and R) and a hold conductor (C);

marker means for the terminating section to operate the crosspoint relays to connect the set of conductors between a selected terminating junctor and a selected line terminal;

and each terminating junctor further including means effective after completion of the connection through the terminating section to maintain operated the holding means independently of the given potential supplied by the seizure conductor through the selector section, to thereby maintain the holding potential on the holding conductor to the selector section, and also to apply holding potential to the holding conductor of the terminating section.

7. In a communication switching system, the combination as claimed in claim 6, wherein said means to maintain operated the holding means comprises:

one means connected to the transmission path conductor means during one type of call to maintain operated the holding means until the transmission path via the transmission path means is interrupted at one of the terminals to release the holding means upon the interruption of the transmission path;

and another means effective during another type of call to hold the holding means operated responsive to a signal of the given potential applied via the seizure conductor via the inlet circuit through the selector section, and means responsive to a different potential applied via the inlet circuit and the selector section on said seizure conductor to restore the holding means in the terminating junctor to thereby release the connection.

8. In a communication switching system, the combination as claimed in claim 7, wherein the terminating junctor further includes means responsive to answering of the call via the selected line terminal to apply a potential to said seizure conductor to transmit a signal via the connection through the selector section and the inlet terminal that the call has been answered.

9. In a communication switching system, a switching network comprising a first and a second switching section, each section comprising a plurality of crosspoint relays in co-ordinate arrays to selectively connect any one of a plurality of inlet terminals to any one of a plurality of outlet terminals of the section, at least one of the sections having a plurality of stages in tandem, each crosspoint relay having a hold winding in series with a normally open set of contacts, each connection in each section having a hold conductor extending from the inlet terminal through the hold windings and series contacts of a crosspoint relay of each stage to the outlet terminal;

marker means to operate the crosspoint relays to establish connctions in each section between selected inlet and outlet terminals;

a plurality of supervisory units individually connected to the outlet terminals of the second section, each supervisory unit including seizure means and hold control means, means effective during the establishment of a connection to a supervisory unit to operate its seizure means, means responsive to the operation of the seizure means to operate the holding means to supply a holding potential to the hold conductor at the corresponding outlet terminal of the second section to hold the crosspoint relays of the second section operated;

a plurality of coupling means, each of which is individually connected to an outlet terminal of the first section and an inlet terminal of the second section, said coupling means including a hold-repeating relay means having a winding and contact means, the winding being connected to the hold conductor of the second section at the inlet terminal so that it is held in series with the hold windings of the crosspoint relays and operates when said holding potential is supplied to the hold conductor from the supervisory unit connected at the outlet terminal thereof, and the contact means being connected to operate responsive to energization of said hold-repeating relay means winding to supply a holding potential to the hold conductor of the first section at the corresponding outlet terminal thereof to hold operated the crosspoint relays of the first section, for a connection extending in tandem through the first section, the coupling means, and the second section to the supervisory unit.

10. A communication switching system comprising:

a plurality of communication paths;

a switching network for selectively interconnecting said paths;

a plurality of supervisory units for controlling the establishment of connections, said supervisory units each including holding means;

control means for selectively controlling said network to establish a connection through said switching network between a calling one of said paths and one of said supervisory units; and holding means in the connected supervisory unit responsive to a seizure signal from said calling path through said switching network via said connection to couple a holding potential via said switching network for holding said connection established so that the control of said connection is thereby transferred from the control means to said one of said supervisory units for further establishing connection to another one of the supervisory units and thence to a called one of said paths.

11. A communication switching system as claimed in claim 9:

further including a line switching network, and wherein said calling and called communication paths each include a subscriber line and a corresponding line connection coupled thereto through said line switching network established by the control means.

References Cited

UNITED STATES PATENTS 3,342,942 9/1967 Miller et al. ________ 179—16.45

WILLIAM C. COOPER, *Primary Examiner.*

U.S. Cl. X.R.

179—16